US012664484B1

(12) United States Patent
Adari et al.

(10) Patent No.: US 12,664,484 B1
(45) Date of Patent: Jun. 23, 2026

(54) SHADOW TESTING OF CONTEXTUAL MACHINE LEARNING MODELS

(71) Applicant: Amazon Technologies, Inc., Seattle, WA (US)

(72) Inventors: Mani Kumar Adari, Redmond, WA (US); Santosh Kumar Ameti, Bellevue, WA (US); Vinod Kumar Jagannathan, Sammamish, WA (US); Anchal Nema, Jabalpur (IN)

(73) Assignee: Amazon Technologies, Inc., Seattle, WA (US)

( * ) Notice: Subject to any disclaimer, the term of this patent is extended or adjusted under 35 U.S.C. 154(b) by 982 days.

(21) Appl. No.: 17/810,334

(22) Filed: Jun. 30, 2022

(51) Int. Cl.
| | |
|---|---|
| *G06N 20/00* | (2019.01) |
| *G06F 40/30* | (2020.01) |
| *G06N 20/20* | (2019.01) |

(52) U.S. Cl.
CPC ............. *G06N 20/20* (2019.01); *G06F 40/30* (2020.01)

(58) Field of Classification Search
CPC ................................ G06N 20/20; G06F 40/30
See application file for complete search history.

(56) References Cited

U.S. PATENT DOCUMENTS

| | | | | |
|---|---|---|---|---|
| 10,341,374 | B1 * | 7/2019 | Sadaghiani | G06F 18/217 |
| 11,580,379 | B1 * | 2/2023 | Leen | G06F 9/54 |
| 12,242,892 | B1 * | 3/2025 | Burnett | G06F 9/45533 |
| 2019/0156247 | A1 * | 5/2019 | Faulhaber, Jr. | G06N 3/08 |
| 2020/0234184 | A1 * | 7/2020 | Kesarwani | G06F 16/90335 |

| | | | | |
|---|---|---|---|---|
| 2021/0049348 | A1 * | 2/2021 | Qureshi | G06V 40/165 |
| 2021/0081837 | A1 * | 3/2021 | Polleri | G06F 8/30 |
| 2021/0081848 | A1 * | 3/2021 | Polleri | G06F 11/3409 |
| 2022/0198334 | A1 * | 6/2022 | Guelorget | G06N 20/00 |
| 2022/0300754 | A1 * | 9/2022 | Biswas | G06N 3/082 |
| 2023/0162230 | A1 * | 5/2023 | Warner | G06N 5/042 705/14.53 |
| 2023/0239541 | A1 * | 7/2023 | Gibbs | H04N 21/44213 700/94 |
| 2023/0342670 | A1 * | 10/2023 | Leary | G06F 16/953 |
| 2024/0020417 | A1 * | 1/2024 | Chalk | G06F 21/577 |

OTHER PUBLICATIONS

Ram Vittal, et al., "Deploy Shadow ML models in Amazon SageMaker," AWS Machine Learning, Jul. 6, 2022 pp. 1-10.
ChristopherGS, "Deploying Machine Learning Models in Shadow Mode," Mar. 30, 2019, pp. 1-7.

\* cited by examiner

*Primary Examiner* — Andrew T McIntosh
(74) *Attorney, Agent, or Firm* — S. Scott Foster; Kowert, Hood, Munyon, Rankin & Goetzel, P.C.

(57) ABSTRACT

Shadow testing may be performed to determine whether an updated machine learning model (e.g., an updated machine learning algorithm) is suitable for deployment and replacement of a currently deployed machine learning model. In certain instances, the shadow testing involves machine learning models that determine predictions on the context of language-based user interactions (e.g., the machine learning algorithms are contextual machine learning algorithms). The shadow testing may include asynchronous determinations of predictions by the updated machine learning model on live traffic data being provided to the existing machine learning model. From the shadow testing, disagreement rates between the models and accuracy rates of the models may be used to determine whether the updated machine learning model should be deployed.

20 Claims, 7 Drawing Sheets

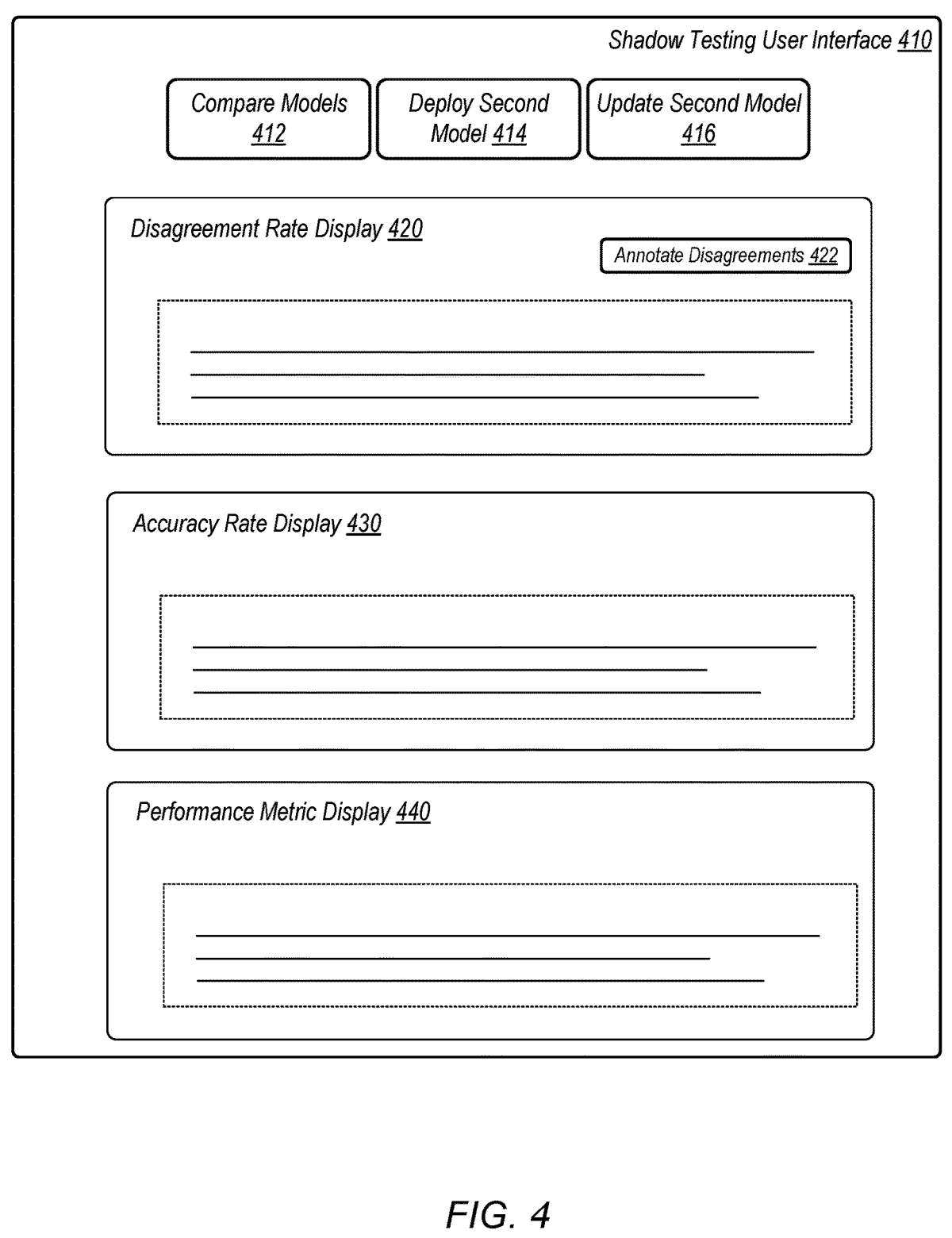

Shadow Testing User Interface 410

| Compare Models 412 | Deploy Second Model 414 | Update Second Model 416 |

Disagreement Rate Display 420

Annotate Disagreements 422

Accuracy Rate Display 430

Performance Metric Display 440

FIG. 4

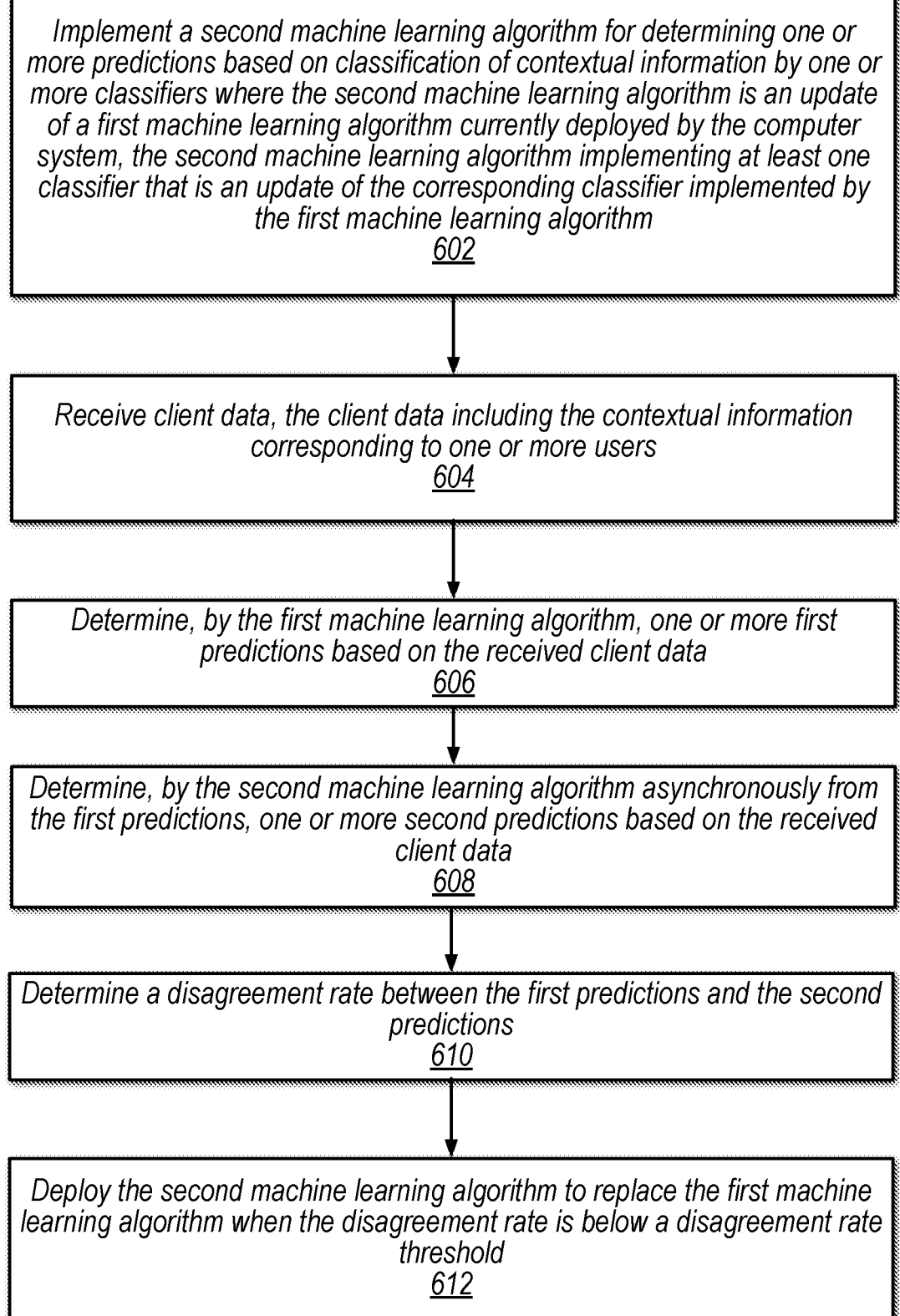

Implement a second machine learning algorithm for determining one or more predictions based on classification of contextual information by one or more classifiers where the second machine learning algorithm is an update of a first machine learning algorithm currently deployed by the computer system, the second machine learning algorithm implementing at least one classifier that is an update of the corresponding classifier implemented by the first machine learning algorithm
602

Receive client data, the client data including the contextual information corresponding to one or more users
604

Determine, by the first machine learning algorithm, one or more first predictions based on the received client data
606

Determine, by the second machine learning algorithm asynchronously from the first predictions, one or more second predictions based on the received client data
608

Determine a disagreement rate between the first predictions and the second predictions
610

Deploy the second machine learning algorithm to replace the first machine learning algorithm when the disagreement rate is below a disagreement rate threshold
612

FIG. 6

SHADOW TESTING OF CONTEXTUAL MACHINE LEARNING MODELS

BACKGROUND

Machine learning (ML) models often need contextual information during their run-time to provide relevant predictions to the problem at hand. In various instances, these contextual ML models need to be iterated based on evolving customer use-cases in order to provide more accurate predictions. Updating ML models and releasing models into production may, however, be challenging to do safely without causing regressions to the existing customer traffic. Typically, validation of model updates is implemented by benchmarking the updated model against the existing datasets (e.g., training datasets). These existing datasets may, however, not fully represent varying customer traffic patterns associated with live traffic.

BRIEF DESCRIPTION OF THE DRAWINGS

FIG. 4 illustrates an example shadow testing user interface, according to some embodiments.

FIG. 6 is a high-level flowchart illustrating various methods and techniques for shadow testing of machine learning models, according to some embodiments.

Figure 1:
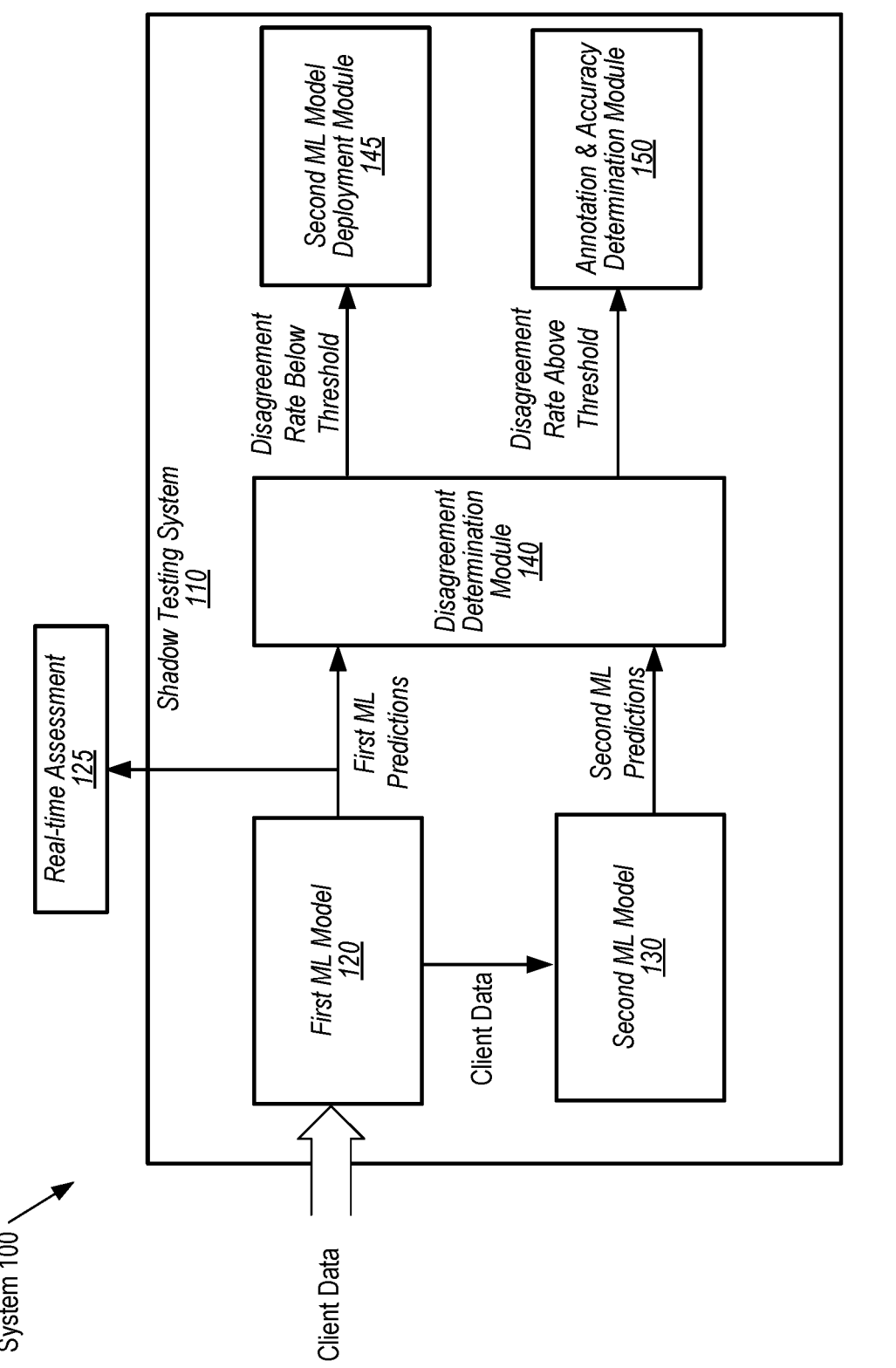
FIG. 1 depicts a block diagram representation of a shadow testing system implementing the above-described framework, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Contextual ML models are often used to provide inferences (e.g., predictions) for language-based interactions for customers. For example, contextual ML models may be used during language-based interactions to provide better understanding the context of a conversation with a customer. The context of the conversation may include textual information, visual information, and/or audio information. Better understanding of the context of the conversation may be useful, for instance, in providing answers to queries by the customer during the interactions. Examples of language-based interactions where contextual ML models may be implemented include, but are not limited to, chatbot interactions, customer service interactions (e.g., online chats with live personnel, telephone calls, video calls, etc.), and purchase transaction interactions.

Contextual ML models that are implemented for language-based interactions are complex ML models that have rely heavily on knowledge on previous interactions due to the complexity of context within the interactions. For instance, in language-based interactions, the order of input (e.g., order of words) is important in determining the context of the interaction. Because of the reliance on previous knowledge and the context of conversations, updating contextual ML models is a complicated and uncertain process. The uncertainty may be due to the lack of straightforward methods for determining whether an updated contextual ML model can provide results that are similar to and/or more accurate than an existing (e.g., currently deployed) contextual ML model because of the reliance on familiar use cases and previous knowledge.

To overcome many of the problems with updating contextual ML models, the present disclosure describes a framework to release contextual machine learning (ML) model upgrades in an automated manner using live shadow testing of the updated model. In various embodiments, live shadow testing of contextual ML models may include, for example, testing the updated ML model on incoming data while the existing ML model is simultaneously operating on the incoming data. Comparison of the operation of the updated ML model to the existing ML model may provide various insights into whether the updated ML model is ready to be released into production (e.g., deployed) to replace the existing ML model.

In various embodiments, upon the initial verification of a new (updated) ML model release candidate using benchmarking, a framework is implemented that will replay live traffic for an existing ML model (e.g., analysis of incoming data by the existing ML model) into the new ML model candidate. In certain embodiments, the new ML model is provided with the current context in the user session (e.g., the live traffic of incoming data) in an asynchronous manner. For instance, the new ML model may be provided the live traffic incoming data at some point after operation by the existing ML model begins either during operation of the existing ML model or shortly after the existing ML model completes its analysis.

After the new ML model candidate completes its analysis of the replayed live traffic (e.g., generates its predictions on the live traffic), the framework may include determining (e.g., calculating) prediction disagreements between the existing ML model and new ML model candidate. The determination of whether to deploy the new ML model candidate may then be determined based on the number of disagreements (e.g., a disagreement rate) between the existing ML model and new ML model candidate. If there is not much disagreement between the existing ML model and new ML model candidate (e.g., the disagreement rate is below a threshold value), then the new ML model may be deployed to replace the existing ML model.

In various embodiments, any disagreements determined in predictions between the ML models may be flagged for annotation. For instance, predictions that are in disagreement may be annotated with known ground truth values for the predictions. Accordingly, when there is sufficient disagreement between the existing ML model and new ML model candidate to provide uncertainty in whether the new ML model should be deployed, further analysis of the accuracy of the predictions may be assessed before deciding whether to deploy the new ML model. For example, accuracy rates for the existing ML model and new ML model candidate may be determined using the predictions in disagreement and their annotations. From these accuracies, a determination may be made whether the new ML model is more accurate than the existing ML model, at which point the new ML model can be deployed. In some embodiments, analysis of performance metrics may also be implemented in decisions on whether to deploy the new ML model to replace the existing ML model.

FIG. 1 depicts a block diagram representation of a shadow testing system implementing the above-described framework, according to some embodiments. In certain embodiments, shadow testing system 110 is implemented in system 100 to determine whether a new, updated machine learning model is to be deployed for replacement of an existing machine learning model. In various embodiments, system 100 is a customer service system and shadow testing system 110 is implemented in the system as a computing system to provide the framework for testing and deployment of new machine learning models described herein. As used herein, the term "computing system" refers to any computer system having one or more interconnected computing devices.

In the illustrated embodiment, shadow testing system 110 implements first ML model 120 and second ML model 130. In various embodiments, first ML model 120 and second ML model 130 are contextual ML models. As used herein, "contextual ML models" include machine learning algorithms that determine predictions of context within input data based on classification of text, audio, and visual information in the data by one or more classifiers. For instance, contextual ML models may assess text, audio, and visual information in language-based interactions to provide context predictions for the interactions. Examples of context prediction types in language-based interactions that may be provided include, but are not limited to, speech recognition, intent classification, semantic slot filling (e.g., filling in missing text in data), and sentiment analysis. It should be noted that while the embodiments described herein are presented with respect to contextual machine learning algorithms, the disclosed embodiments could be applied to non-contextual machine learning algorithms without deviating from the scope of the present disclosure.

In certain embodiments, first ML model 120 is an existing ML model that is currently deployed. For example, first ML model 120 may be deployed by a service system to provide predictions (e.g., inferences) on language-based interactions in the service system. In various embodiments, first ML model 120 is deployed to analyze live traffic data and provide predictions in real-time (e.g., existing ML model 120 is "live").

In certain embodiments, second ML model 130 is an updated version of first ML model 120. For instance, second ML model 130 may include one or more updates intended to improve the performance of predictions made by system 100 in language-based interactions. Second ML model 130 may, for example, include one or more classifiers that have been updated from first ML model 120. In some embodiments, second ML model 130 is benchmarked before being implemented by shadow testing system 110. For instance, second ML model 130 may be benchmarked to provide specified performance metrics before being implemented in shadow testing system 110. Performance metrics may include, but not be limited to, build latency, prediction latency, and model size.

While FIG. 1 depicts an embodiment of shadow testing with two ML models (e.g., first ML model 120 and second ML model 130), additional embodiments may be contemplated where more than one potential updated ML model (e.g., multiple "second" ML models 130) are shadow tested along with first ML model 120. In such embodiments, various metrics may be implemented to determine which of the multiple "second" ML models 130 is to be deployed. For instance, the "second" ML model 130 with the lowest disagreement rate or with the highest accuracy rate (described herein) could be deployed to replace first ML model 120 (assuming the replacement second ML model meets the thresholds described herein).

In the illustrated embodiment, client data is provided to first ML model 120. In various embodiments, the client data is received by system 100 as "live traffic". For instance, in certain embodiments, the client data includes textual information, visual information, or audio information associated with language-based interactions with one or more users that is being acquired in real-time. Accordingly, the client data is "live traffic" for first ML model 120 to provide real-time assessment (e.g., live predictions) for contextual information in the language-based interactions. For example, as shown in FIG. 1, predictions by first ML model 120 (e.g., "first ML predictions) are output for real-time assessment 125 in system 100. Additional embodiments may be contemplated where the client data received by shadow testing system 110 includes previously acquired data or training data (e.g., datasets labelled with known values for predictions).

In the illustrated embodiment, shadow testing system 110 implements second ML model 130 as a "shadow" of first ML model 120. In certain embodiments, second ML model 130 operates asynchronously of first ML model 120. For example, the client data input into first ML model 120 may be provided to second ML model 130 at some point in time after first ML model 120 begins processing the client data. Thus, second ML model 130 is operating on live traffic but not in a live time frame (e.g., at a time frame that is near or close to live but not simultaneously with first ML model 120). Additionally, predictions made by second ML model 130 are not implemented in live customer interactions since the second ML model is not currently deployed in system 100. Asynchronous operation of second ML model 130 on the live traffic allows for testing of the second ML model 130 on current client data to provide better contextual comparison between the updated second ML model and the existing, first ML model 120. Asynchronous operation of second ML model 130 on the live traffic may also provide offline operation of the framework for shadow testing of the second ML model.

In certain embodiments, as shown in FIG. 1, first predictions from first ML model 120 and second predictions from second ML model 130 are determined by the models from the input client data and provided to disagreement determination module 140. In various embodiments, as described above, first predictions from first ML model 120 are real-time predictions for live traffic of the client data while second predictions from second ML model 130 are asynchronous predictions for the live traffic of client data (e.g., offline predictions). The predictions made by first ML model 120 and second ML model 130 may include various predictions described herein. For instance, in certain embodiments, the predictions include predictions of context in language-based interactions. The first and second predictions may include various types of predictions. Examples of types of predictions include, but are not limited to, speech recognition, intent classification, semantic slot filling, and sentiment analysis. In some embodiments, the first and second predictions include multiple predictions of different types. For instance, the first and second predictions may include multiple predictions selected from speech recognition predictions, intent classification predictions, semantic slot filling predictions, and sentiment analysis predictions. In some embodiments, the first and second predictions include multiple predictions of a single type of prediction. For example, the predictions may include multiple speech recognition predictions.

Figure 2:
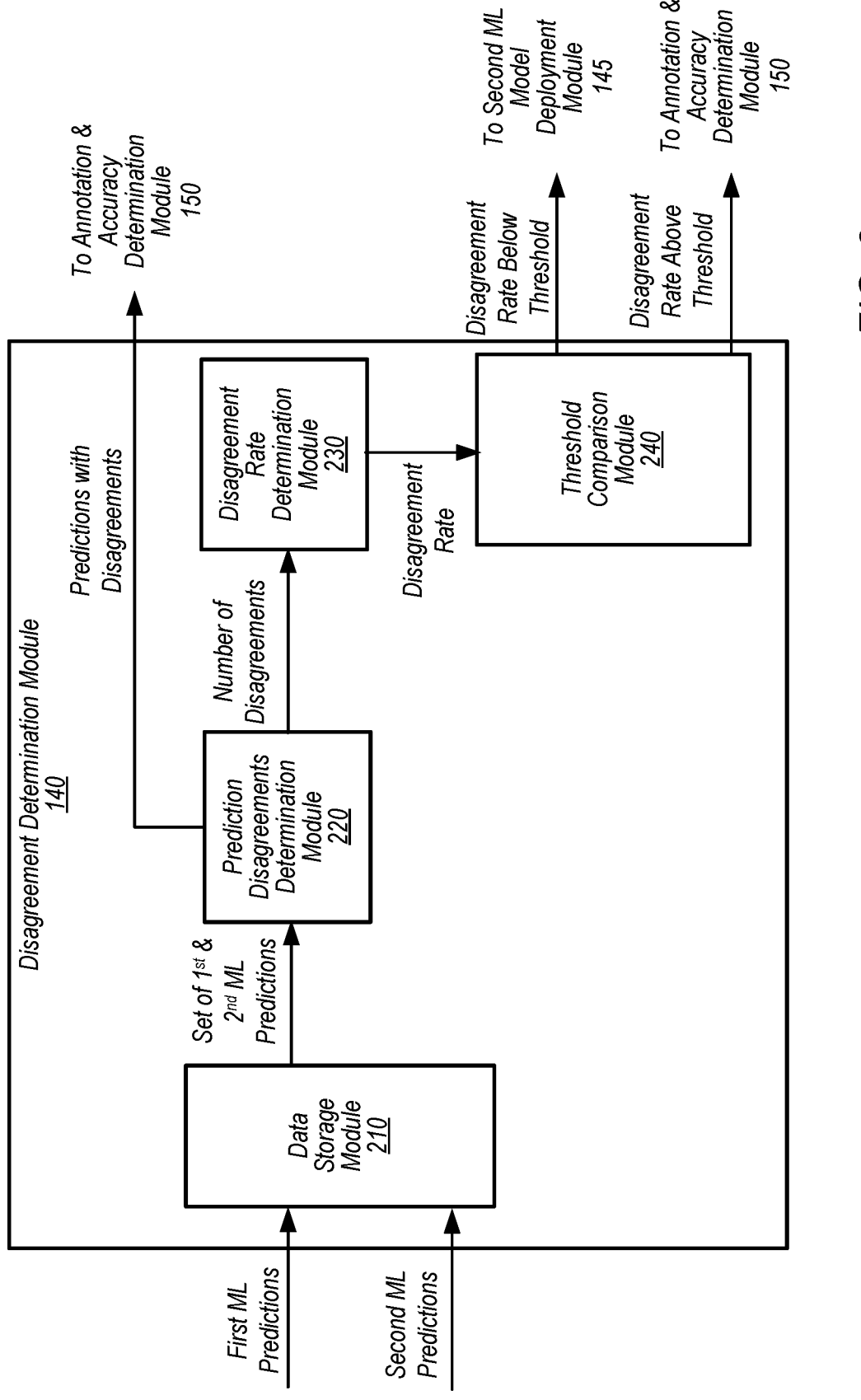
FIG. 2 is a block diagram representation of a disagreement determination module, according to some embodiments.

In various embodiments, disagreement determination module 140 may assess the first and second predictions to determine a level of disagreement between first ML model 120 and second ML model 130. The level of disagreement may then be assessed to determine whether to replace first ML model 120 with second ML model 130 in the current deployment. FIG. 2 is a block diagram representation of disagreement determination module 140, according to some embodiments. In the illustrated embodiment, disagreement determination module 140 includes data storage module 210, prediction disagreements determination module 20, disagreement rate determination module 230 and threshold comparison module 240.

Data storage module 210 may be, for example, a data store or other memory implemented in disagreement determination module 140. In certain embodiments, data storage module 210 receives the first predictions from first ML model 120 and the second predictions from second ML model 130. Accordingly, data storage module 210 provides persistent data storage for predictions as the predictions are determined on the input client data (e.g., the live traffic) by first ML model 120 and second ML model 130.

After a predetermined number of predictions are stored in data storage module 210 (or after a predetermined amount of time for live traffic assessment), a set of first and second predictions are accessed by prediction disagreements determination module 220. Prediction disagreements determination module 220 may then determine where the second predictions disagree with the first predictions (e.g., which predictions determined by first ML model 120 and second ML model 130 have disagreements). The number of disagreements determined by prediction disagreements determination module 220 may be provided to disagreement rate determination module 230. Additionally, information on the predictions with disagreements (e.g., information on which predictions are in disagreement) may be provided to annotation and accuracy determination module 150 for further processing as described herein.

In various embodiments, disagreement rate determination module 230 determines a disagreement rate based on the number of disagreements received from prediction disagreements determination module 220. The disagreement rate may be, for example, a percentage or absolute difference value that represents the number of disagreements in the set of first and second predictions. For example, if the set of first and second predictions includes 100 predictions and prediction disagreements determination module 220 determines that there are 7 predictions with disagreements, the disagreement rate may be 0.07 or 7%. Various embodiments may be contemplated that implement other determination algorithms for disagreement rates. For instance, a heuristic model may be implemented to determine a disagreement rate between the first and second predictions.

The disagreement rate determined by disagreement rate determination module 230 may be provided to threshold comparison module 240. Threshold comparison module 240 may determined whether the disagreement rate is above or below a predetermined threshold for the disagreement rate. The predetermined threshold may be a value of the disagreement rate, for example, that determines whether second ML model 130 should be deployed or not. For example, in many instances of contextual machine learning, the second ML model 130 replace the first ML model 120 when there is a small amount of disagreement between the models. The small amount of disagreement may indicate that the second ML model 130 is not too divergent from the first ML model 120 and when the second ML model 130 replaces the first ML model 120, there should be little to no interruption to the quality of service provided in live interactions for system 100.

In certain embodiments, if the disagreement rate is below the threshold (e.g., below a percentage threshold), then it may be considered that second ML model 130 is ready for release (e.g., deployment) and the second ML model 130 will replace first ML model module 120. In one contemplated embodiment, the threshold for the disagreement rate is at most 10%. In some embodiments, the threshold for the disagreement rate is set between a value of 5% and 10%.

If, however, the disagreement rate is above the threshold, further analysis of the ML modules may be needed in order to determine whether the disagreements are due to the second ML model 130 being more accurate in determining predictions than the first ML model 120 or the disagreements are due to the second ML model 130 needing more refinement before being released/deployed.

As shown in FIG. 2, threshold comparison module 240 may output whether the disagreement rate is above the threshold or the disagreement rate is below the threshold. Turning back to FIG. 1, when the disagreement rate is above the threshold, that determination is provided to second ML model deployment module 145. Second ML model deployment module 145 may in turn implement the deployment of second ML model 130 to replace first ML model 120 in system 100. When the disagreement rate is below the threshold, that determination is provided to annotation and accuracy determination module 150, which may make a further determination on deployment of the second ML model 130, as described further here.

Figure 3:
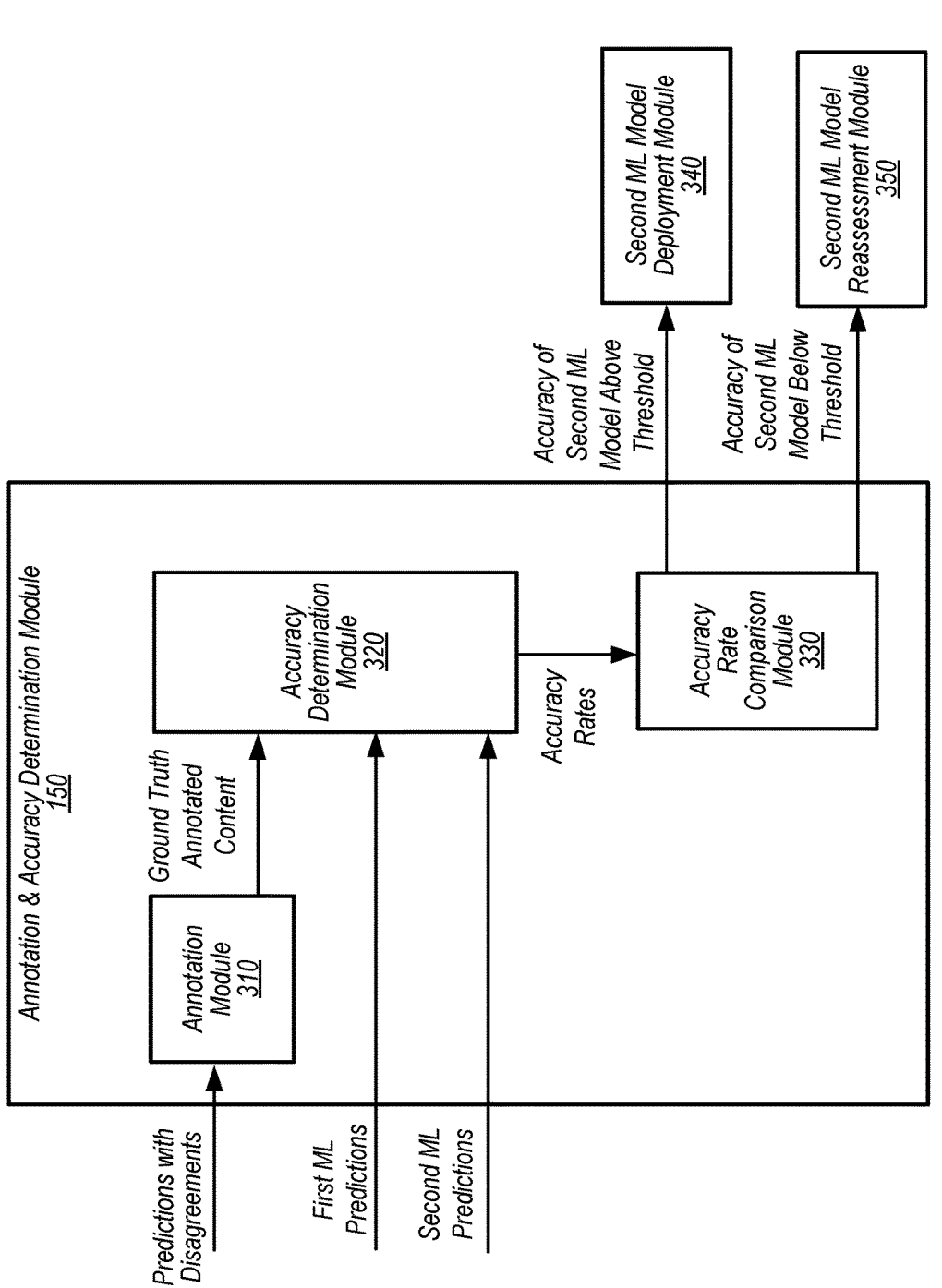
FIG. 3 is a block diagram representation of an annotation and accuracy determination module, according to some embodiments.

FIG. 3 is a block diagram representation of annotation and accuracy determination module 150, according to some embodiments. In the illustrated embodiment, annotation and accuracy determination module 150 includes annotation module 310, accuracy determination module 320, and accuracy rate comparison module 330. In various embodiments, annotation module 310 receives information on the predictions with disagreements (e.g., information on which predictions are in disagreement). The information may also include the data associated with the predictions in disagreement (e.g., data in the client data for which the predictions have been determined).

In certain embodiments, annotation module 310 provides annotation of ground truth values to the predictions that are in disagreement between the first ML model 120 and the second ML model 130. For instance, annotation module 310 may annotate the content in the client data with the ground truth values for the predictions with disagreements (e.g., the "disagreement predictions"). In some embodiments, the ground truth values are values of the actual output in the client data. For example, the actual words for language-based interactions. In various embodiments, annotation by annotation module 310 include sannotation that is done automatically, manually (e.g., by a user on the computer), or a combination of automatically and manually. For instance, an implementation of annotation module 310 may include providing a display on a user interface of the content of disagreement predictions along with options for user to either automatically or manually annotate the content with ground truth values for the content. Further examples of user interfaces for implementation of the disclosed embodiments of shadow testing system 110 are described herein.

The annotated content along with the first predictions and the second predictions are then provided to accuracy determination module 320. Accuracy determination module 320 may determine accuracy rates for the first ML model 120 and the second ML model 130. In certain embodiments, the accuracy rates are determined only for the disagreement predictions (e.g., the predictions with disagreements determined by prediction disagreements determination module 220, shown in FIG. 2). Analysis of accuracy in the predictions where disagreement occurred may provide information on whether the disagreements between the first ML model 120 and the second ML model 130 are due to the second ML model being more accurate with the updates or due to the second ML model not being ready for deployment and needing more refinement.

In various embodiments, accuracy determination module 320 determines the accuracy rates for the first ML model 120 and the second ML model 130 based on the annotated content, the first predictions, and the second predictions. For example, an accuracy rate for the first ML model 120 may be determined by a comparison of the first predictions for the disagreement predictions against the known ground truth values for the disagreement predictions (as shown by the annotated content). Similarly, an accuracy rate for the second ML model 130 may be determined by a comparison of the second predictions for the disagreement predictions against the known ground truth values for the disagreement predictions (as shown by the annotated content).

After determination of these accuracy rates, the accuracy rates may be compared in accuracy rate comparison module 330. In certain embodiments, when the accuracy rate for the second ML model 130 is higher than the accuracy rate for the first ML model 120, the accuracy rate of the second ML model 130 may be determined to be "above threshold", as shown in FIG. 3. When the second ML model 130 accuracy is above the threshold, it may be an indication that the second ML model 130 has become more accurate in making predictions with the updates over the first ML model 120. Accordingly, second ML deployment module 340 may then implement deployment of the second ML model 130 to replace the first ML model 120 (similar to the deployment implemented by second ML deployment module 145, shown in FIG. 1).

When the accuracy rate for the second ML model 130 is lower than the accuracy rate for the first ML model 120, the accuracy rate of the second ML model 130 may be determined to be "below threshold", as shown in FIG. 3. When the second ML model 130 accuracy is below the threshold, it may be an indication that the second ML model 130 needs more refinement before it can be deployed and replace the first ML model 120. Accordingly, second ML reassessment module 350 may implement a refinement process for the second ML model 130. In various embodiments, the refinement process for the second ML model 130 includes assessment of the second ML model 130 and the second predictions and updating the classifiers by providing additional training of the second ML model 130.

In some embodiments, a determination of whether the accuracy rate of the second ML model 130 is "above threshold" or "below threshold" includes a determination of whether the accuracy rate for the second ML model 130 is a predetermined amount above the accuracy rate of the first ML model 120. For instance, the accuracy rate for the second ML model 130 may need to be some percentage or some absolute amount higher than the accuracy rate for the first ML model 120 in order to be considered "above threshold". As a specific example, if the accuracy rate for the first ML model 120 is 60%, an embodiment may be contemplated where the accuracy rate for the second ML model 130 needs to be at least 5% higher than the accuracy rate for the first ML model 120 ((e.g., the accuracy rate for the second ML model 130 needs to be 65% or higher).

In various embodiments, a decision on deployment of the second ML model 130 may also take into account performance metrics of the second ML model 130 during the shadow testing (e.g., performance metrics while the second ML model 130 makes predictions asynchronously on live traffic client data received by first ML model 120). For example, the performance metrics may be assessed by second ML deployment module 145 or second ML deployment module 340, shown in FIGS. 1 and 3, respectively, before a final determination for deployment of the second ML model 130 is made. Examples of performance metrics that may be determined for the second ML model 130 include, but are not limited to, build latency (e.g., time to load ML model), inference/prediction latency (e.g., time to make predictions on the data), and model size (e.g., memory occupied by ML model). In some embodiments, performance metrics of the second ML model 130 may be taken into account for deployment independently of performance metrics of the first ML model 120. In other embodiments, performance metrics of the second ML model 130 may be compared to performance metrics of the first ML model 120 before making a determination of deployment for the second ML model 130.

In some embodiments, deployment of the second ML model 130 could include a tradeoff between functions of the first ML model 120 and the second ML model 130. For instance, the accuracy determinations made by annotation and accuracy determination module 150 may include determinations that the first ML model 120 is more accurate in making certain types of predictions while the second ML model 130 is more accurate in making other types of predictions. In such instances, embodiments may be contemplated where the first ML model 120 is deployed for the types of predictions it has higher accuracy in making while the second ML model 130 is deployed for the types of predictions it has higher accuracy in making. As another example, the first ML model 120 may be more accurate in handling certain types of data while the second ML model 130 may be more accurate in handling other types of data. Accordingly, embodiments may be contemplated where the first ML model 120 is deployed for the types of data for which it has higher accuracy while the second ML model 130 is deployed for the types of data for which it has higher accuracy.

FIG. 4 illustrates an example shadow testing user interface, according to some embodiments. Shadow testing user interface (UI) 410 may utilize various different types of user interface elements. Thus, the following examples are not intended to be limiting. In the illustrated embodiment shadow testing UI 410 includes disagreement rate display 420, accuracy rate display 430, and performance metric display 440. In various embodiments, disagreement rate display 420 displays the disagreement rate determined by disagreement determination module 140, accuracy rate display 430 displays accuracy rates determined by annotation and accuracy determination module 150, and performance metric display 440 displays performance metrics determined by, for example, second ML deployment module 145 or second ML deployment module 340, as described herein.

Shadow testing 410 UI may also include various elements to perform one or more actions described herein. For example, in one contemplated embodiment, disagreement rate display 420 may include an element to initiate an action to annotate disagreements 422. Annotate disagreements 422 may be presented in shadow testing UI 410, for instance, when the disagreement rate is above a threshold, as described herein, to allow a user to initiate the action of annotating content for the disagreement predictions.

Examples of additional actions that may have elements in shadow testing UI 410 include compare models 412, deploy second model 414, and update second model 416. Compare models 412 may be an element activated to begin the shadow testing process described herein. Deploy second model 414 may be an element activated to initiate the model deployment process for the second ML model 130 (e.g., when the disagreement rate is below the threshold or when the accuracy rate of the second model exceeds the accuracy rate of the first model, as described herein). Update second model 416 may be an element activated to send the second ML model 130 for further training, as described herein (e.g., when the accuracy rate of the second model does not exceed the accuracy rate of the first model).

Figure 5:
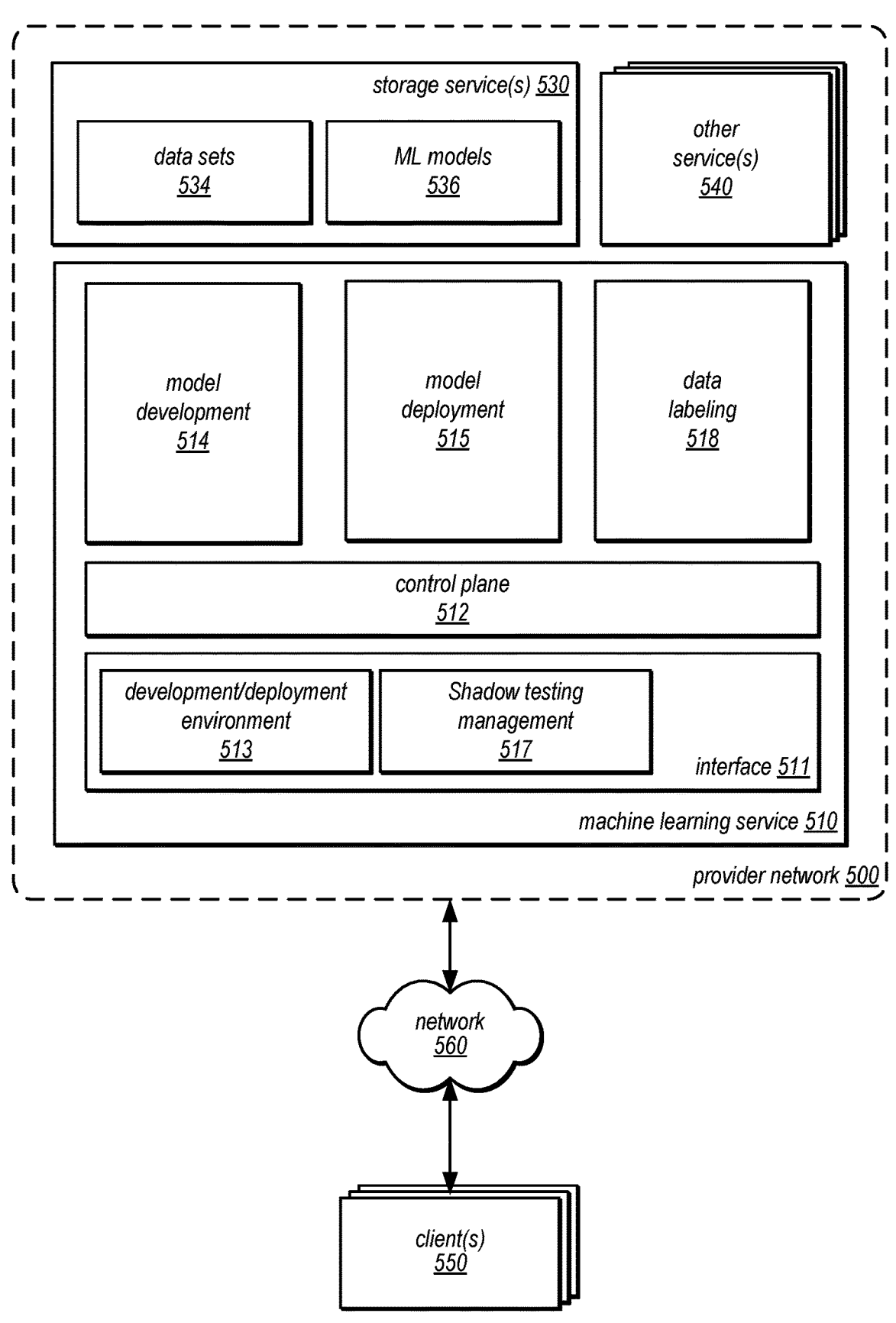
FIG. 5 illustrates an example provider network that may implement a contextual machine learning algorithm that implements, according to some embodiments.

FIG. 5 illustrates an example provider network that may implement a contextual machine learning algorithm that implements, according to some embodiments. Provider network 500 may be a private or closed system or may be set up by an entity such as a company or a public sector organization to provide one or more services (such as various types of customer interaction services) accessible via the Internet and/or other networks to clients 550, in one embodiment. Provider network 500 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and services offered by the provider network 500, in one embodiment. In some embodiments, provider network 500 may implement various computing resources or services, such as machine learning service 510, storage service(s) 530, and/or any other type of network-based services 540 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 5 may be implemented directly within computer hardware, as instructions directly or indirectly executable by computer hardware (e.g., a microprocessor or computer system), or using a combination of these techniques. For example, the components of FIG. 5 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of machine learning service 510 may be implemented by a particular node or may be distributed across several nodes. In some embodiments, a given node may implement the functionality of more than one service system component (e.g., more than one data store component).

Machine learning service 510 may implement interface 511 to allow clients (e.g., client(s) 550 or clients implemented internally within provider network 500, such as a client application hosted on another provider network service like an event driven code execution service or virtual compute service) to compress, train, and deploy machine learning models (e.g., neural networks) and/or utilize data labeling systems. For example, machine learning service 510 may implement interface 511 (e.g., a graphical user interface, programmatic interface that implements Application Program Interfaces (APIs) and/or a command line interface) may be implemented so that a client can submit, edit, or otherwise implement various different model development, deployment, labeling or other management requests. For example, interface 511 may include development and deployment environment 513, which may provide a training script or other code editor with various development tools to create, submit, and/or monitor machine learning pipeline with a training job and/or monitoring job, as discussed below. Development and management environment 513 may be a graphical interface, in some embodiments, and may provide an interface to past results generated for other models, in some embodiments.

In various embodiments, shadow testing management 517 may provide various editors, version management features, model development interfaces, model deployment interfaces, data labeling application creation interfaces, or other features for implementation of shadow testing system 100 discussed above with regard to FIGS. 1-4. Interface 511 may also allow a client to request the performance of training, deployment, or other machine learning service features, in various embodiments.

Machine learning service 510 may implement a control plane 512 to perform various control operations to implement the features of machine learning service 510. For example, control plane 512 may monitor the health and performance of requests at different components, such as training as part of model development, execution of machine learning models as part of model deployment 515 or labeling applications as part of data labeling 518. For example, if a node or other component fails, a request fails, or other interruption occurs, control plane 512 may be able to restart a job to complete a request (e.g., instead of sending a failure response to the client). Control plane 512 may, in some embodiments, may arbitrate, balance, select, or dispatch requests to different node(s), in various embodiments. For example, control plane 512 may receive requests via interface 511 which may be a programmatic interface, and identify an available node to begin work on the request.

Machine learning service 510 may implement model development 514 to develop, configure, program, define, and/or otherwise execute training jobs on various machine learning models using data sets, such as data sets 534 in storage services 530 across one or more training nodes (which may include one or more respective processing devices for training, such as GPUs). In some embodiments, machine learning service 510 may offer various virtual machines, instances, containers, images, or other applications on these training nodes that may implement various machine learning training frameworks (e.g., TensorFlow, PyTorch, MXNet, and XGBoost, among others) upon which machine learning models may be specified or otherwise described using, for instance, development environment 513, and executed. Various tests or other development operations for machine learning models may also be performed. In some embodiments, the various files, configuration information, and other data for machine learning model development may be organized as a project (or other collection) and stored, versioned, or otherwise managed by model development 514 (e.g., as a collection of one or more files or data objects in storage services 530, including data sets 534 and ML models 536). Training jobs may be submitted to training nodes (e.g., via development environment 513 or other interfaces) to train machine learning models on identified data set(s). Shadow testing jobs may be submitted to testing nodes (e.g., via shadow testing management 517 or other interfaces) to implement testing of ML models 536 for model deployment 515.

In various embodiments, machine learning service 510 may implement model deployment 515, which may deploy a trained machine learning model on resources (e.g., virtual compute instances or containers) to receive and return inferences or other results according to requests or other inputs to the deployed model. For example, different types or configurations of resources (e.g., virtual compute instances with various hardware capabilities, including different amounts of processing capacity, memory, storage, and/or specialized hardware, such as GPUs and tensor processor units (TPUs)) may be provisioned or otherwise obtained from other services of provider network 500 (e.g., a virtual compute service) and then the machine learning model deployed to that provisioned resource along with various software or other applications to support the receipt of requests for inferences and return inferences. In various embodiments, model deployment 515 may be implemented in the deployment of machine learning models subsequent to shadow testing (e.g., shadow testing organized by shadow testing management 517). For instance, model deployment 515 may be implemented by second ML deployment module 145 or second ML deployment module 340, as described above.

In various embodiments, data labeling applications may be implemented or managed as part of data labeling 518 to provide data sets 534 for training and developing machine learning models. Data labeling 518 may also implement various features to manage execution of data labeling applications in various embodiments. For example, similar to model development 514 and model deployment 515, one or more nodes or other computing resources may be managed by data labeling 518 in order to generate and execute a data labeling application. Different data labeling jobs may be used to instantiate and execute a data labeling application. For instance, different parameters to specify or otherwise configure the interface of a data labeling application, the input data set(s), the taxonomy (in some embodiments), or various other parameters for the data labeling application. Data labeling 518 may then generate (e.g., modify a data labeling application according to the received parameters) and then install or otherwise deploy the application to the provisioned nodes.

Data storage service(s) 530 may implement different types of data stores for storing, accessing, and managing data on behalf of clients 550 as a network-based service that enables clients 550 to operate a data storage system in a cloud or network computing environment. Data storage service(s) 530 may also include various kinds relational or non-relational databases, in some embodiments. Data storage service(s) 530 may include object or file data stores for putting, updating, and getting data objects or files, in some embodiments. For example, one data storage service 530 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 530 may be treated as a data lake. For example, an organization may generate many different kinds of data, stored in one or multiple collections of data objects in a data storage service 530. The data objects in the collection may include related or homogenous data objects, such as database partitions of sales data, as well as unrelated or heterogeneous data objects, such as image data files (e.g., digital photos or video files) audio files and web site log files. Data storage service(s) 530 may be accessed via programmatic interfaces (e.g., APIs) or graphical user interfaces.

Generally speaking, clients 550 may encompass any type of client that can submit network-based requests to provider network 500 via network 560, including requests for machine learning service 510 (e.g., a request to create or perform an explanation job, interact with development and management environment 513, etc.). For example, a given client 550 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 550 may be an application that can interact directly with provider network 500. In some embodiments, client 550 may generate network-based services requests according to a Representational State Transfer (REST)-style network-based services architecture, a document- or message-based network-based services architecture, or another suitable network-based services architecture.

In some embodiments, a client 550 may provide access to provider network 500 to other applications in a manner that is transparent to those applications. Clients 550 may convey network-based services requests (e.g., access requests to configure or perform explanation jobs) via network 560, in one embodiment. In various embodiments, network 560 may encompass any suitable combination of networking hardware and protocols necessary to establish network-based-based communications between clients 550 and provider network 500. For example, network 560 may generally encompass the various telecommunications networks and service providers that collectively implement the Internet. Network 560 may also include private networks such as local area networks (LANs) or wide area networks (WANs) as well as public or private wireless networks, in one embodiment. For example, both a given client 550 and provider network 500 may be respectively provisioned within enterprises having their own internal networks. In such an embodiment, network 560 may include the hardware (e.g., modems, routers, switches, load balancers, proxy servers, etc.) and software (e.g., protocol stacks, accounting software, firewall/security software, etc.) necessary to establish a networking link between given client 550 and the Internet as well as between the Internet and provider network 500. It is noted that in some embodiments, clients 550 may communicate with provider network 500 using a private network rather than the public Internet.

FIG. 6 is a high-level flowchart illustrating various methods and techniques for shadow testing of machine learning models, according to some embodiments. As indicated at 602, a computer system implements a second machine learning algorithm for determining one or more predictions based on classification of contextual information by one or more classifiers where the second machine learning algorithm is an update of a first machine learning algorithm currently deployed by the computer system, the second machine learning algorithm implementing at least one classifier that is an update of the corresponding classifier implemented by the first machine learning algorithm.

At 604, the computer system receives client data that includes contextual information corresponding to one or more users. At 606, the first machine learning algorithm determines one or more first predictions based on the received client data and at 608, the second machine learning algorithm, asynchronously from the first predictions, determines one or more second predictions based on the received client data.

At 610, the computer system determines a disagreement rate between the first predictions and the second predictions. And then at 612, the computer system deploys the second machine learning algorithm to replace the first machine learning algorithm when the disagreement rate is below a disagreement rate threshold.

In some embodiments, when the disagreement rate is above the disagreement rate threshold, the computer system implements annotation of content in the received client data with known ground truth values for predictions that are in disagreement between the first predictions and the second predictions, determines an accuracy rate for the first machine learning algorithm based on the annotated content for the predictions that are in disagreement between the first predictions and the second predictions, determines an accuracy rate for the second machine learning algorithm based on the annotated content for the predictions that are in disagreement between the first predictions and the second predictions, and deploys the second machine learning algorithm to replace the first machine learning algorithm when the accuracy rate for the second machine learning algorithm exceeds the accuracy rate for the first machine learning algorithm.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
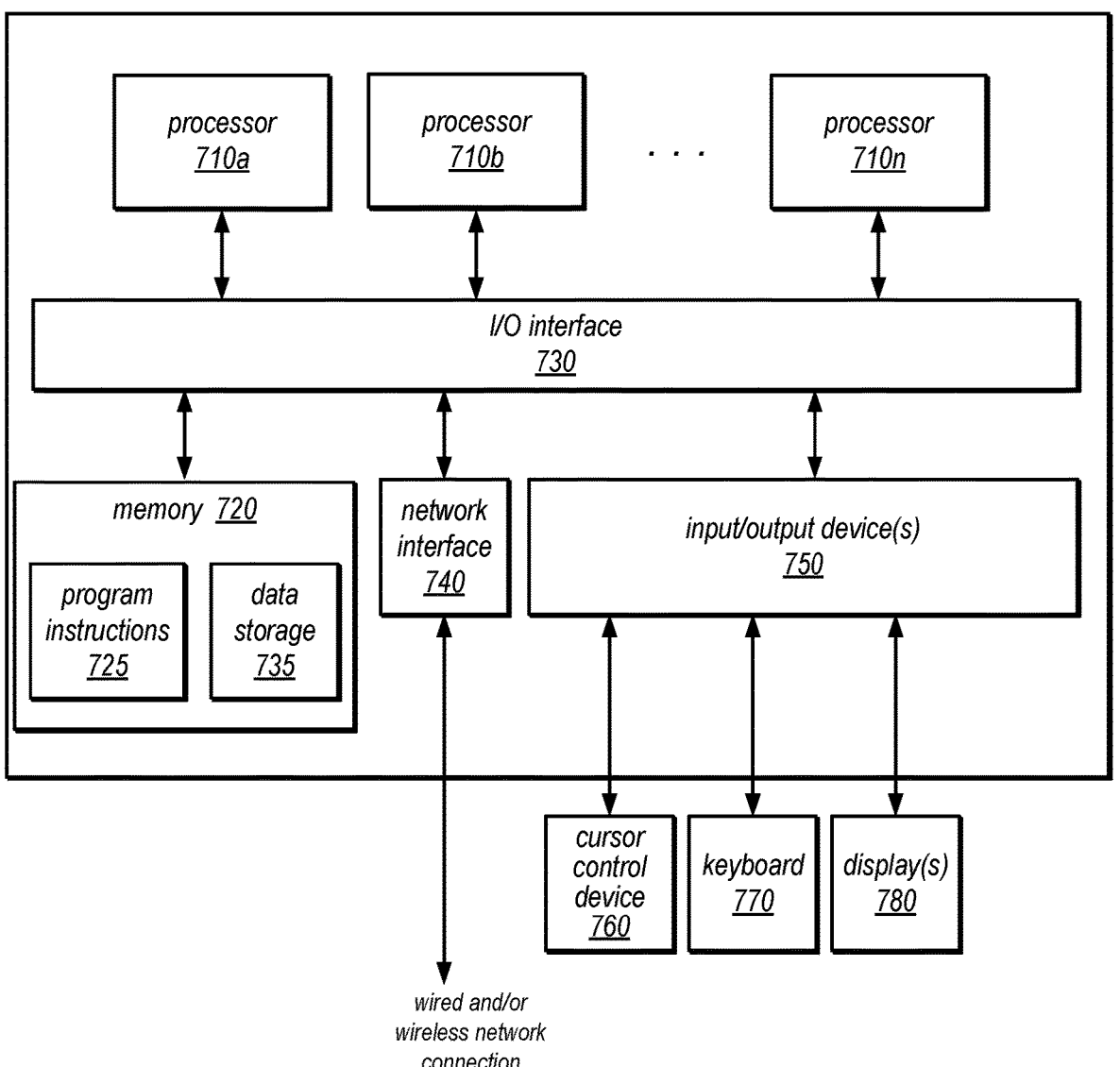
FIG. 7 illustrates an example system to implement the various methods, techniques, and systems described herein, according to some embodiments.

Embodiments of shadow testing for machine learning models (e.g., machine learning algorithms) as described herein may be executed on one or more computer systems, which may interact with various other devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) 780 may include standard computer monitor(s) and/or other display systems, technologies or devices. In at least some implementations, the input/output devices 750 may also include a touch- or multi-touch enabled device such as a pad or tablet via which a user enters input via a stylus-type device and/or one or more digits. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC. SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 720 may store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement explanation jobs for computer vision tasks, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a non-transitory, computer-readable storage medium may include storage media or memory media such as magnetic or optical media, e.g., disk or CD/DVD-ROM coupled to computer system 700 via I/O interface 730. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, that implement the various methods and techniques as described herein, and data storage 735, comprising various data accessible by program instructions 725. In one embodiment, program instructions 725 may include software elements of embodiments as described herein and as illustrated in the Figures. Data storage 735 may include data that may be used in embodiments. In other embodiments, other or different software elements and data may be included.

Those skilled in the art will appreciate that computer system 700 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. The various methods as illustrated in the figures and described herein represent example embodiments of methods. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
at least one processor; and
a memory, storing program instructions that when executed by the at least one processor, cause the at least one processor to:
deploy a first machine learning algorithm for determining one or more first predictions based on classification of contextual information by one or more first classifiers;
implement a second machine learning algorithm for determining one or more second predictions based on classification of contextual information by one or more second classifiers, wherein the second machine learning algorithm is an update of the first machine learning algorithm, the second machine learning algorithm implementing at least one classifier that is an update of the corresponding classifier implemented by the first machine learning algorithm;
receive client data, the client data including contextual information corresponding to language-based interactions with one or more users;
apply the first machine learning algorithm to determine one or more first predictions based on the received client data;
apply the second machine learning algorithm asynchronously from the first machine learning algorithm to determine one or more second predictions based on the received client data;
determine a number of disagreed predictions, wherein the disagreed predictions are predictions for which the second predictions disagree with the first predictions;
determine a disagreement rate for the second machine learning algorithm based on the number of disagreed predictions and a total number of predictions;
deploy the second machine learning algorithm to replace the first machine learning algorithm when the disagreement rate is below a disagreement rate threshold;
determine, for the disagreed predictions when the disagreement rate is above the disagreement rate threshold, a first accuracy rate of the first predictions and a second accuracy rate of the second predictions based on known ground truth values of the disagreed predictions; and
deploy the second machine learning algorithm to replace the first machine learning algorithm when the second accuracy rate exceeds the first accuracy rate by a predetermined amount.

2. The system of claim 1, wherein the memory stores further program instructions that when executed further cause the at least one processor to:
determine one or more performance metrics for the first machine learning algorithm;

determine one or more performance metrics for the second machine learning algorithm; and assess the performance metrics for the first machine learning algorithm and the performance metrics for the second machine learning algorithm to determine whether to deploy the second machine learning algorithm to replace the first machine learning algorithm when either the disagreement rate is below the disagreement rate threshold or the second accuracy rate exceeds the first accuracy rate by the predetermined amount.

3. The system of claim 1, wherein the memory stores further program instructions that when executed further cause the at least one processor to:

generate a user interface that displays values for one or more of the disagreement rate, the first accuracy rate, the second accuracy rate, the performance metrics for the first machine learning algorithm, and the performance metrics for the second machine learning algorithm.

4. The system of claim 1, wherein the first predictions and the second predictions include one or more of the following types of predictions: speech recognition predictions, intent classification predictions, slot filling predictions, and sentiment analysis predictions.

5. A method, comprising:

implementing, by a computer system, a second machine learning algorithm for determining one or more predictions based on classification of contextual information by one or more classifiers, wherein the second machine learning algorithm is an update of a first machine learning algorithm currently deployed by the computer system, the second machine learning algorithm implementing at least one classifier that is an update of the corresponding classifier implemented by the first machine learning algorithm;

receiving, by the computer system, client data, the client data including the contextual information corresponding to one or more users;

determining, by the first machine learning algorithm, one or more first predictions based on the received client data;

determining, by the second machine learning algorithm asynchronously from the first predictions, one or more second predictions based on the received client data;

determining, by the computer system, a disagreement rate between the first predictions and the second predictions;

determining accuracy rates for the first machine learning algorithm and the second machine learning algorithm based on the disagreement rate being above a disagreement threshold; and deploying the second machine learning algorithm to replace the first machine learning algorithm based on an accuracy rate for the second machine learning algorithm exceeding an accuracy rate for the first machine learning algorithm.

6. The method of claim 5, further comprising, based on the disagreement rate being above the disagreement rate threshold:

annotating content in the received client data with known ground truth values for predictions that are in disagreement between the first predictions and the second predictions;

determining, by the computer system, the accuracy rate for the first machine learning algorithm based on the annotated content for the predictions that are in disagreement between the first predictions and the second predictions;

determining, by the computer system, the accuracy rate for the second machine learning algorithm based on the annotated content for the predictions that are in disagreement between the first predictions and the second predictions.

7. The method of claim 6, further comprising, based on the accuracy rate for the second machine learning algorithm not exceeding the accuracy rate of the first machine learning algorithm, refining the second machine learning algorithm.

8. The method of claim 7, wherein refining the second machine learning algorithm includes:

assessing the second machine learning algorithm and the second predictions; and providing additional training for the second machine learning algorithm based on the assessment.

9. The method of claim 5, wherein the contextual information in the received client data includes one or more of the following types of contextual information: text information, audio information, and image information.

10. The method of claim 5, wherein the first machine learning algorithm and the second machine learning algorithm are implemented to provide predictions for speech recognition in language-based interactions with the one or more users.

11. The method of claim 5, wherein the first machine learning algorithm and the second machine learning algorithm are implemented to provide predictions for intent classification for language-based interactions with the one or more users.

12. The method of claim 5, wherein the first machine learning algorithm and the second machine learning algorithm are implemented to provide predictions for slot filling for language-based interactions with the one or more users.

13. The method of claim 5, wherein the first machine learning algorithm and the second machine learning algorithm are implemented to provide predictions for sentiment analysis for language-based interactions with the one or more users.

14. The method of claim 5, further comprising:

storing the first predictions and the second predictions in a data store as the predictions are determined; and retrieving, by the computer system, the first predictions and the second predictions from the data store after a predetermined number of predictions have been made to determine the disagreement rate between the first predictions and the second predictions.

15. One or more non-transitory, computer-readable storage media, storing program instructions that when executed on or across one or more computing devices cause the one or more computing devices to implement:

receiving data from language-based interactions with one or more users, the data including contextual information corresponding to the language-based interactions with the one or more users;

operating a first machine learning algorithm for determining one or more first predictions on the received data based on classification of the contextual information by one or more first classifiers, wherein the first predictions are provided as real-time predictions for the language-based interactions;

asynchronously operating a second machine learning algorithm for determining one or more second predictions on the received data based on classification of the contextual information by one or more second classifiers, wherein the second classifiers include least one classifier that has been changed from the first classifiers;

after a predetermined number of first and second predictions have been made, determining a disagreement rate between the first predictions and the second predictions;

switching the second machine learning algorithm to provide the real-time predictions for the language-based interactions when the disagreement rate is below a disagreement rate threshold;

when the disagreement rate is above the disagreement rate threshold, determining accuracy rates for the first machine learning algorithm and the second machine learning algorithm; and switching the second machine learning algorithm to provide the real-time predictions for the language-based interactions when an accuracy rate for the second machine learning algorithm exceeds an accuracy rate for the first machine learning algorithm.

16. The one or more non-transitory, computer-readable storage media of claim 15, storing further program instructions that when executed on or across the one or more computing devices, cause the one or more computing devices to further implement when the disagreement rate is above the disagreement rate threshold:

annotating content in the received data with known ground truth values for predictions that are in disagreement between the first predictions and the second predictions;

determining the first accuracy rate for the first machine learning algorithm based on the annotated content for the predictions that are in disagreement; and determining the second accuracy rate for the second machine learning algorithm based on the annotated content for the predictions that are in disagreement; and switching the second machine learning algorithm to provide the real-time predictions for the language-based interactions when the second accuracy rate exceeds the first accuracy rate by a predetermined amount.

17. The one or more non-transitory, computer-readable storage media of claim 16, storing further program instructions that when executed on or across the one or more computing devices, cause the one or more computing devices to further implement:

providing additional training for the second machine learning algorithm when the second accuracy rate does not exceed the first accuracy rate by the predetermined amount.

18. The one or more non-transitory, computer-readable storage media of claim 15, wherein switching the second machine learning algorithm to provide the real-time predictions for the language-based interactions includes stopping the first machine learning algorithm from providing the real-time predictions for the language-based interactions.

19. The one or more non-transitory, computer-readable storage media of claim 15, wherein the disagreement rate threshold is a disagreement rate of at most 10%.

20. The one or more non-transitory, computer-readable storage media of claim 15, wherein asynchronously operating the second machine learning algorithm for determining the one or more second predictions includes operation of the second machine learning algorithm to provide predictions for the language-based interactions offline from the one or more users.

* * * * *